Sept. 23, 1969     D. J. POITRAS     3,469,203
AMPLIFIER CONTROL SYSTEM

Filed Aug. 20, 1965     2 Sheets-Sheet 1

INVENTOR.
DONALD J. POITRAS
BY John V. Regan
Attorney

# United States Patent Office 3,469,203
Patented Sept. 23, 1969

3,469,203
AMPLIFIER CONTROL SYSTEM
Donald J. Poitras, Haddonfield, N.J., assignor to RCA
Corporation, a corporation of Delaware
Filed Aug. 20, 1965, Ser. No. 481,284
Int. Cl. H03f 1/36, 3/68
U.S. Cl. 330—84                                    12 Claims

ABSTRACT OF THE DISCLOSURE

An amplifier control system useful in D.C. motor control applications is described. The output transistors of the power amplifier are maintained in a linear region of their characteristics during the turn-on-turnoff and reversal transients of a printed circuit D.C. motor by means of current limiting feedback circuits which become operative only when the output current exceeds a predetermined value. To prevent short circuits during the reversal transient, an interlock circuit inhibits operation of the positive portion of the amplifier when the negative portion is on and vice versa.

---

This invention relates to control circuitry, and more particularly to control amplifiers for driving D.C. motors.

Motors of the D.C. (direct current) type are generally driven by amplifiers. When rapid acceleration or deceleration of a D.C. motor is desirable, the amplifier is called upon to deliver overdrive energy to the motor. When the motor is accelerating, overdrive energy is applied until the motor approaches the desired speed. After the desired speed is attained, a smaller steady state drive is applied to maintain the motor speed. When the motor decelerates, overdrive energy is applied in the opposite direction until the motor approaches zero speed. During the overdrive periods the output stages of the amplifier may saturate. Saturation of the output transistors results in the motor acceleration or deceleration becoming proportional to variations in supply voltage. Accordingly, it becomes necessary to use expensive and space consuming supply voltage regulators. Moreover, saturated transistors require longer periods of time to settle into linear operation as the overdrive transient period expires.

Amplifiers may be of the push-pull type when used to drive reversible D.C. motors. Push-pull type amplifiers for this purpose may be considered as having two separate amplifier sections. One of the amplifier sections is operable to supply drive current for motor rotation in the forward direction and for deceleration from rotation in the reverse direction; while the other amplifier section is operable to supply drive current for motor rotation in the reverse direction and for deceleration from rotation in the forward direction. When the motor is required to turn off, or to go from forward to reverse rotation, or vice versa, one of the amplifier sections must turn off while the other must turn on. If this transition occurs when one of the amplifier sections is supplying overdrive to the motor, both amplifier sections may be fully on at the same time. This condition is undesirable since due to the low impedance and the saturated or nearly saturated transistors in the output circuits of the two amplifier sections, a substantial short circuit would result across the supply voltages.

It is an object of this invention to limit the current flow in the output stages of a drive amplifier during overdrive periods.

It is another object of this invention to minimize the effects of supply voltage variations on motor acceleration and deceleration during overdrive periods.

It is still another object of this invention to prevent substantially short circuit conditions from arising in a driver amplifier when the rotation of a D.C. motor is either stopped or reversed.

Briefly stated, some of the objects of this invention are achieved by providing a means for operating the transistors in the output stage of a drive amplifier for a D.C. motor in a linear region of their characteristics during an overdrive period. More particularly the output stage of the amplifier is coupled in series with the D.C. motor by an impedance means. A feedback means responsive to a predetermined current flow through the impedance means during the overdrive periods only provides a degenerative feedback circuit in the amplifier. The degenerative feedback circuit operates to maintain the transistors in the output stage of the amplifier in the linear regions of their operating characteristics. Linear operation of the output stage of the amplifier during the overdrive periods tends to limit current flow in the output circuit and to minimize the effects of supply voltage variations on motor acceleration and deceleration.

The invention also provides an interlock network to prevent a short circuit condition in the driver amplifier when rotation of the D.C. motor is either stopped or reversed. The drive amplifier for a reversible motor is considered to have first and second sections each having input, intermediate and output stages connected in cascade. The output stages of the first and second amplifier sections are coupled in series with the D.C. motor by first and second impedance means, respectively. An interlock means senses current flow and inhibits operation of the second amplifier section when the current flow is sensed in the first impedance means and inhibits operation of the first amplifier section when current flow is sensed in the second impedance means. Consequently, one only of the amplifier sections can be operating at any one time.

Figure 1:
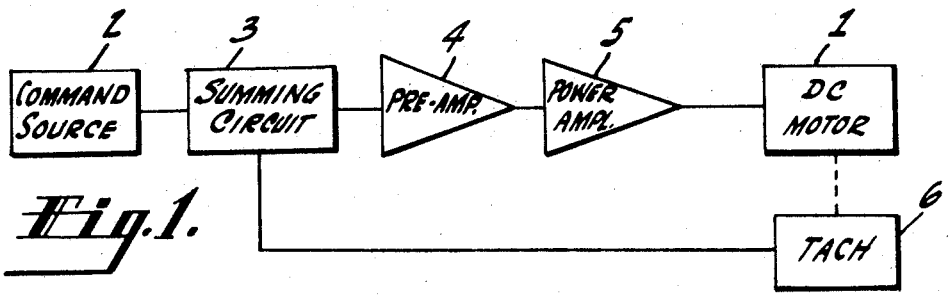
FIG. 1 is a diagram of a control system in which a driver amplifier according to the invention may be used.

In FIG. 1, the device to be controlled by the control system is a D.C. motor 1, preferably a reversible, printed circuit type motor. The output of the D.C. motor may be used, for example, in a magnetic tape transport apparatus wherein the motor shaft is coupled to a tape drive capstan arrangement (not shown). Suitable drive energy for the motor 1 is obtained from a command source 2 by way of a summing circuit 3, a preamplifier 4 and a power or drive amplifier 5. The command source may, in accordance with the above exemplary motor load, be a computer which is associated with the magnetic tape transport apparatus (not shown). The output shaft of motor 1 is monitored by a tachometer 6. The output of the tachometer 6 is coupled to the summing circuit 3 to provide a feedback control of motor 1.

Figure 3:
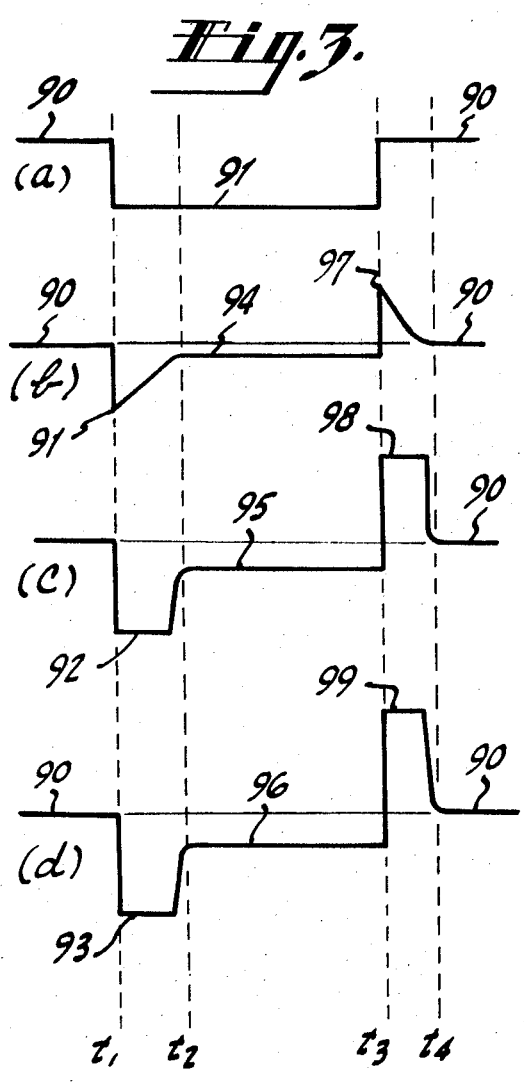
FIGS. 3 and 4 are diagrams of typical waveforms used in the control system of FIG. 1 and the amplifier of FIG. 2.
Figure 4:
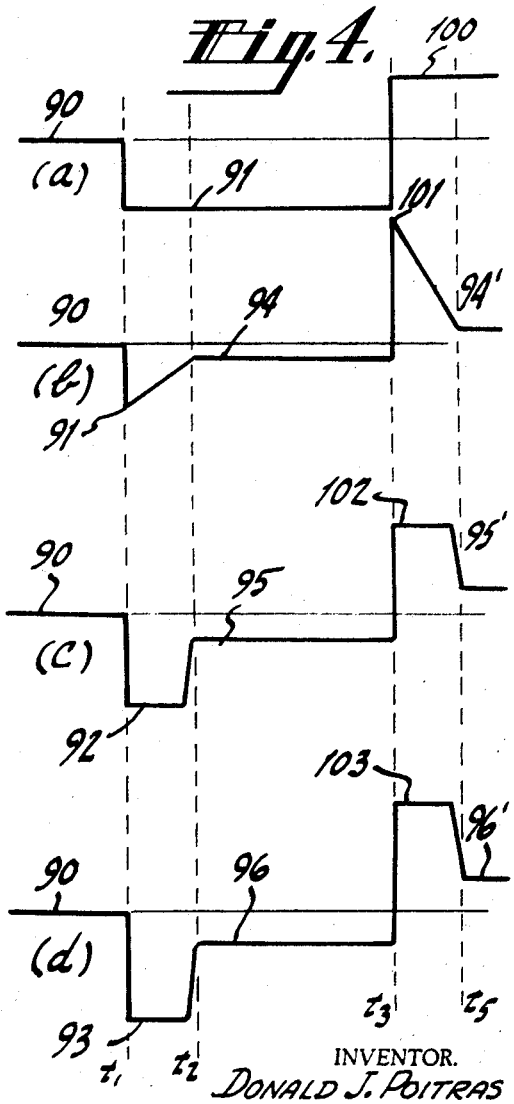

The control system is operative to rapidly accelerate and decelerate the D.C. motor by applying overdrive energy during the acceleration and deceleration periods. When the D.C. motor attains the desired speed, the control system applies a lesser steady state energy which is just sufficient to maintain this speed. The waveform diagrams of FIGS. 3 and 4 are helpful to illustrate the operation of the control system.

FIG. 3(a) is a diagram of a typical output waveform of the command source 2. FIGS. 3(b), 3(c) and 3(d) are output waveforms of the summing circuit 3, the preamplifier 4 and the power amplifier 5, respectively. The output waveform of the summing circuit 3 in FIG. 3(b) is considered to be the error voltage waveform.

When the output of the command source 2 is at the zero voltage reference level 90, the control system is inoperative and the motor 1 is at a standstill. For purposes of illustration, forward motor rotation is assumed to result from negative going waveforms. Thus, for forward rotation of the motor, the command source 2 generates a waveform which abruptly changes in a negative direction to voltage level 91 at time $t_1$. The error voltage waveform in FIG. 3(b) also changes to the voltage 91 at time $t_1$. The voltage 91 is large enough to cause the preamplifier and the driver amplifier to operate in a non-linear range so that they provide substantially constant voltage levels 92 and 93 (FIG. 3(c) and 3(d)). The motor begins to accelerate. As the speed of the motor increases, the tachometer feedback increases in a positive direction. The error voltage waveform in FIG. 3(b) begins to decrease from voltage 91. The overdrive voltage levels 92 and 93 remain constant until the error voltage waveform decreases sufficiently to operate the preamplifier 4 and the drive amplifier 5 in a linear range. When this happens, their respective voltage waveforms decrease to steady state voltage levels 95 and 96 as the error voltage decreases to the level 94.

The voltage levels 94, 95 and 96 are representative of the steady state error voltage which is necessary to maintain the D.C. motor at the desired speed. The average absolute amplitude of this succeeding steady state portion of the error voltage waveform is less than the average absolute amplitude of the initial overdrive portion of the error voltage waveform.

When the motor 1 is to be turned off, the output waveform of the command source 2 abruptly changes from the voltage level 91 to the zero voltage reference level 90 at time $t_3$. At this time the motor 1 is rotating at the desired steady state speed; and the tachometer feedback is positive and equivalent to the difference between voltage levels 91 and 94. Therefore, the error voltage waveform in FIG. 3(b) changes abruptly in a positive direction to the voltage 97. The voltage 97 is large enough to operate the preamplifier and power amplifiers in a nonlinear range so that their output waveforms provide the substantially constant voltage levels 98 and 99 at time $t_3$. With the positive voltage level 99 being applied to the D.C. motor 1, the D.C. motor begins to decelerate. As the speed of the motor decreases the tachometer feedback also decreases. The error voltage waveform decreases from voltage 97 toward the zero voltage reference level 90 at which the motor speed becomes zero at time $t_4$. When the error voltage decreases sufficiently to operate the preamplifier and power amplifier in a linear range, their output waveforms also decrease toward the zero voltage reference level 90. Again, the average absolute amplitude of the steady state portion of the error voltage waveform is generally less than the average absolute amplitude of the overdrive portion during the deceleration period.

Consider now that the D.C. motor is rotating in the previously assumed forward direction at a desired steady state speed after being accelerated in the manner described above, and that at time $t_3$ the command source 2 issues a command to reverse the direction of motor rotation. The waveform in FIG. 4(a) illustrates this command as an abrupt change from the negative voltage level 91 to the positive voltage level 100. Since the motor rotation is forward at this time, the tachometer feedback is positive and equivalent to the difference between the voltage levels 91 and 94. This positive feedback is additive to the positive voltage level 100 in the summing circuit 3 to result in the error voltage waveform changing abruptly from the negative steady state voltage level 94 to the positive voltage 101 in FIG. 4(b). The voltage 101 is sufficient to operate the preamplifier and power amplifier in a non-linear range so that their output waveforms in FIGS. 4(c) and 4(d) provide the substantially constant voltage levels 102 and 103, respectively, at time $t_3$. With the positive voltage level 103 being applied to the D.C. motor 1, the D.C. motor begins to decelerate. As the speed of the motor decreases, the tachometer feedback also decreases. When the feedback becomes zero corresponding to zero speed of the motor, the error voltage waveform is still positive by an amount equal to voltage level 100; therefore, the motor begins to accelerate in the reverse direction. The tachometer feedback now becomes negative and the error voltage waveform continues to decrease to the steady state voltage level 94' at which the motor attains the desired steady state speed in the reverse direction at time $t_5$. The preamplifier and power amplifier output waveforms also decrease toward the steady state voltage levels 95' and 96', respectively. Again, the average absolute amplitude of the steady state portions of the error voltage waveform is generally less than the average absolute amplitude of the overdrive portion during this deceleration and acceleration period.

Figure 2:
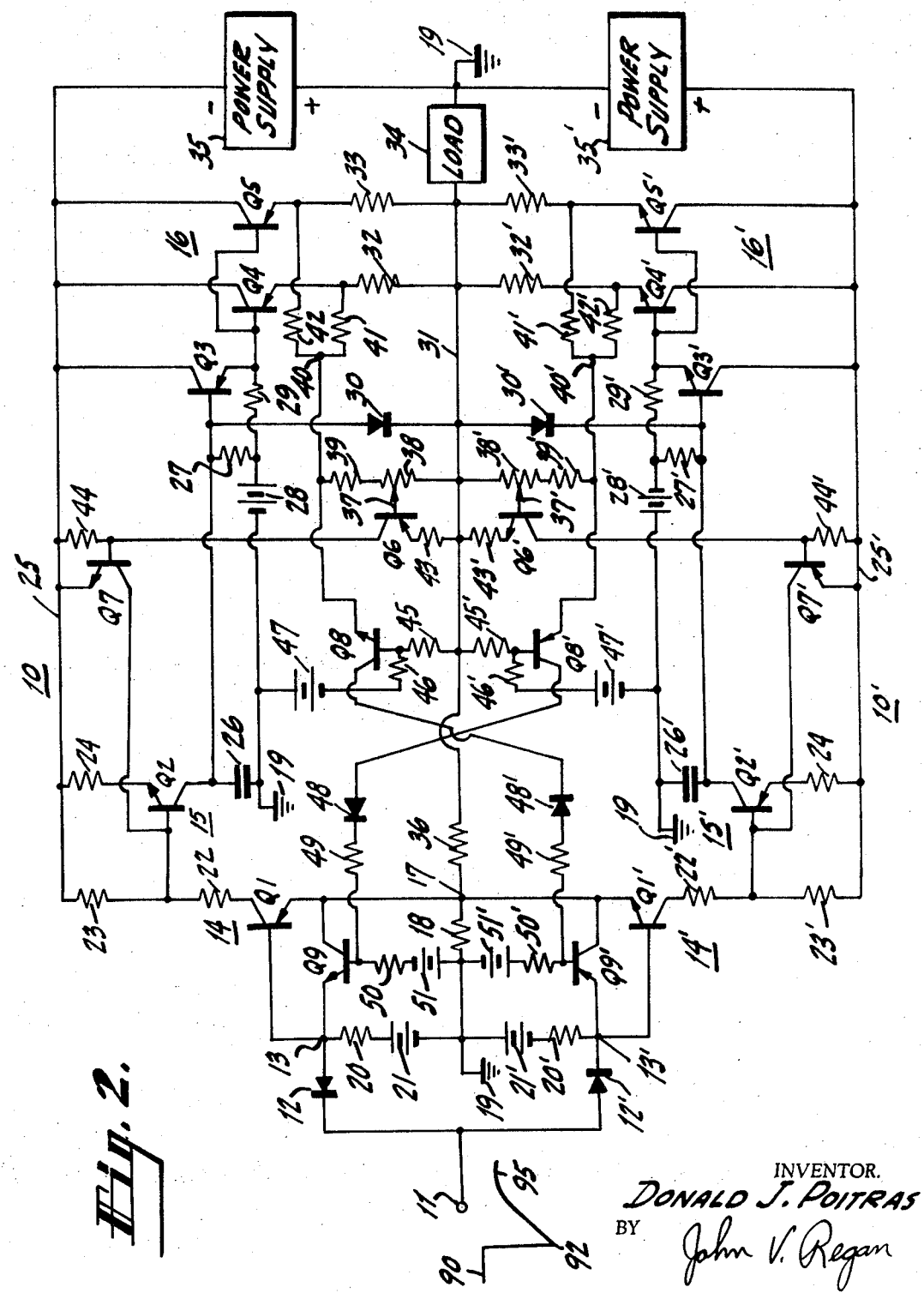
FIG. 2 is a schematic diagram of a driver amplifier in accordance with this invention.

As previously mentioned, the present invention is primarily concerned with the power amplifier 5, a detailed schematic of which is shown in FIG. 2. The power amplifier is of the push-pull type and is considered to have first and second similar sections 10 and 10'. Each amplifier section 10 and 10' is illustrated as having a plurality of stages including input stages 14 and 14', intermediate stages 15 and 15' and output stages 16 and 16'. Input stages 14 and 14' are comprised of transistors Q1 and Q1', respectively, each connected in the common emitter configuration and each being of the illustrated conductivity type. The base electrodes of transistors Q1 and Q1' are connected to first stage inputs 13 and 13', respectively. The inputs 13 and 13' are connected by way of diodes 12 and 12', poled in the illustrated manner, to a common input 11.

The emitters of transistors Q1 and Q1' are considered as the common electrodes of the first stages 14 and 14'. These emitters are coupled together at circuit point 17. Circuit point 17 is coupled by way of resistors 18 to a source of common reference potential 19, illustrated by the conventional ground symbol. The bases of transistors Q1 and Q1' are further connected to the reference potential 19 by way of resistors 20 and 20' and bias supplies 21 and 21' having the illustrated polarities. Preferably, the bias supplies 21 and 21' have the same value and resistors 20 and 20' have the same value.

The collectors of input stage transistors Q1 and Q1' are connected by way of resistors 22 and 22' to the bases of intermediate stage transistors Q2 and Q2', respectively. The bases of transistors Q2 and Q2' are also connected by way of resistors 23 and 23' to circuit points 25 and 25', respectively. The emitters of transistors Q2 and Q2' are also connected by way of resistors 24 and 24' to circuit points 25 and 25'. The collectors of transistors Q2 and Q2' are connected by way of high frequency roll-off capacitors 26 and 26' to the ground reference 19.

The collectors of intermediate stage transistors Q2 and Q2' are further connected to the bases of output stage transistors Q3 and Q3', respectively. The collectors of transistors Q3 and Q3' are connected to circuit points 25 and 25', respectively. The bases of transistors Q3 and Q3' are connected by way of bias supply resistors 27 and 27' and bias supplies 28 and 28' to the ground reference 19. Preferably, bias supply resistors 27 and 27' have the same value; and bias supplies 28 and 28' have the same value. Bias supply resistors 27 and 27' are further connected by way of stabilizing resistors 29 and 29' to the emitters of transistors Q3 and Q3', respectively. The emitters of transistors Q3, Q3' are connected by stabilizing resistors 29, 29' to bias supplies 28, 28', respectively. Diodes 30 and 30' connect the bases of transistors Q3 and Q3' to a common circuit point 31.

The emitters of transistors Q3 and Q3' are each connected to the bases of two pairs of further output transistors Q4 and Q5 and Q4' and Q5', respectively. The collectors of transistors Q4 and Q5 are connected to circuit point 25. The collectors of transistors Q4' and Q5' are connected to circuit point 25'. The emitters of transistors Q4 and Q5 are connected by way of resistors 32 and 33 to circuit point 31. The emitters of transistors Q4' and Q5' are connected by way of resistors 32' and 33' to circuit point 31.

The collector-to-emitter paths of transistors Q4 and Q5 are connected in parallel with each other between circuit points 25 and 31 to form the output circuit of the output stage 16 of amplifier section 10. This parallel connection is connected in series with a load impedance 34 and a D.C. power supply 35 having the illustrated polarity. The collector-to-emitter paths of transistors Q4' and Q5' are likewise connected in parallel with each other between circuit points 25' and 31'. This parallel connection is also connected in a series circuit with load impedance 34 and D.C. power supply 35' having the illustrated polarity. The connection of load impedance 34 to the positive side of power supply 35 and to the negative side of power supply 35' is further connected to ground reference 19. Circuit point 31 is also connected to circuit point 17 by way of feedback resistor 36. The load impedance 34 is preferably a reversible D.C. motor although it could be any load impedance which requires an initial overdrive for rapid energization thereof.

Consider now the operation of the above-described amplifier during the quiescent or standstill condition of the D.C. motor load. For this condition, a zero voltage reference level 90 is applied to input 11 as illustrated in FIG. 3(c). Both input stage transistors Q1 and Q1' are reverse biased into nonconductive regions of their characteristics. Bias supplies 21 and 21' and resistors 20 and 20' reduce and minimize the leakage currents of the two transistors. Intermediate stage transistors Q2 and Q2' are also reverse biased into cutoff for the standstill condition.

Transistor Q3 is slightly forward biased by bias supply 28, resistors 27 and 29 and diode 30. Leakage current flows from bias supply 28 through resistor 27 to the base of transistor Q3. Current also flows from bias supply 28 through resistor 29. This current provides leakage current for the cutoff transistors Q4 and Q5 and also provides emitter current for transistor Q3.

Transistor Q3' is also slightly forward biased in the same manner as transistor Q3. Diodes 30 and 30' are both forward biased at this time so that current also flows in the series circuit of bias supply 28, resistor 27, diode 30, diode 30', resistor 27' and bias supply 28'. Hence, the bias networks operate to maintain transistors Q3 and Q3' slightly forward biased and transistors Q4, Q5, Q4', and Q5' biased into cutoff for the quiescent or standstill condition. Thus, substantially no current is supplied to the D.C. motor load for this condition.

Although the following description relates to motor acceleration in a forward direction from zero motor speed due to negative overdrive, it is apparent that the principles involved are fully applicable whenever the error voltage waveform goes negative. The error voltage may also go negative in response to a command to decelerate the motor from a steady state reverse speed to zero speed, or to change motor rotation from reverse to forward.

When the motor is to accelerate in a forward direction, the input 11 changes abruptly from the zero voltage reference level 90 in a negative direction to the voltage level 92 as illustrated in FIG. 3(c). This negative voltage level 92 is coupled to the base of transistor Q1 by diode 12; and the transistor becomes forward biased. Diode 12' becomes reverse biased at this time, thereby preventing reverse voltage breakdown of the base-to-emitter junction of transistor Q1'.

As transistor Q1 begins to conduct, the voltage at the base of transistor Q2 begins to increase in a positive direction biasing the latter transistor into conduction. With transistor Q2 conducting, the voltage at the base of transistor Q3 begins to decrease in a negative direction rendering the latter transistor more conductive and reverse biasing diode 30. Transitsor Q3 operates in the emitter-follower manner to decrease the voltage at the bases of transistors Q4 and Q5, thereby forward biasing the latter transistors into conduction. With transistors Q4 and Q5 conducting, current is supplied to the D.C. motor load.

When rapid acceleration of the motor is desired, the amount of voltage overdrive or the value of voltage level 92 is generally large enough to saturate transistors Q2, Q3, Q4 and Q5. If transistors Q4 and Q5 saturate, the current in the D.C. motor load becomes substantially proportional to variations in the D.C. power supply 35. If the D.C. power supply should increase in value, the rate of acceleration of the motor would vary since the torque is proportional to the current. Consequently, it becomes necessary to use a regulated power supply. Regulated power supplies are usually complex in circuit configuration and therefore expensive and space consuming.

Whereas amplifier section 10 responds to negative waveforms; amplifier section 10' responds to positive-going waveforms. Positive going waveforms may occur either to accelerate the motor from zero speed to a desired steady state speed in the reverse direction, to decelerate the motor from forward steady state speed to zero speed, or to change from forward to reverse rotation. It is apparent that D.C. supply 35' also must be a regulated supply in order to prevent excessive and variable current flow in the output circuit of amplifier section 10'.

The present invention avoids the use of expensive and space consuming regulated power supplies by preventing saturation of the output transistors with current limiting feedback networks in each of the sections 10 and 10' of the amplifier. The current limiting feedback network in amplifier section 10 includes a transistor Q6 having its base connected to the moveable arm 37 of a potentiometer 38. The potentiometer 38 is connected in series with a resistor 39 between circuit points 31 and 40. Circuit point 40 is connected in common to resistors 41 and 42. Resistors 41 and 42 are also connected to the emitters of transistors Q4 and Q5, respectively. The emitter of transistor Q6 is coupled by way of resistor 43 to circuit point 31. The collector of transistor Q6 is connected to circuit point 25 by way of resistor 44.

The collector of transistor Q6 is further connected to the base of transistor Q7. The emitter of transistor Q7 is connected to circuit point 25 and its collector is connected to the base of intermediate stage transistor Q2. The feedback network in amplifying section 10' is similar to the one in amplifying section 10. The like circuit elements in amplifying section 10' bear prime reference numerals which correspond to the reference numerals used for the amplifying section 10 network.

The potentiometer arms 37 and 37' are initially set so that each transistor Q6 and Q6' is nonconductive until the current flow in the output circuits of amplifying sections 10 and 10' attains a predetermined value which is adequate to rapidly accelerate or decelerate the motor but is inadequate for the output stage transistors to saturate. For the example of steady state forward rotation of the motor previously presented, the current flowing in the resistors 32 and 33 is averaged by resistors 41 and 42. As the motor begins to accelerate, transistor Q6 is nonconductive until the average current flowing in resistors 32 and 33 attains the predetermined value. When the predetermined value is reached, transistor Q6 becomes forward biased into conduction. As transistor Q6 begins to conduct, the voltage at the base of transistor Q7 begins to increase so that the latter transistor is forward biased into conduction. The conduction of transistor Q7 tends to decrease the voltage at the base of intermediate stage transistor Q2 so that it bucks or tends to cancel the overdrive signal in a degenerative manner. This degenerative feedback tends to prevent saturation of transistors Q2, Q3, Q4 and Q5 thereby limiting the current flow in resistors 32 and 33 even though the input voltage level 92 may have a value much larger than that needed to yield the predetermined current flow in resistors 32 and 33. The output voltage and current remain constant so long as the input signal is large enough to cause the feedback circuit to operate. For these conditions, the power amplifier is considered to be operating in a nonlinear range.

As mentioned previously, the current flow must be adequate to rapidly accelerate or decelerate the motor. Consequently, transistors Q4 and Q5 are operated near saturation but in a linear portion of their operating characteristics during the transient period. When so operated, the transistors function as substantially constant current devices. Since constant current devices have relatively large output impedances, the inductive time constant of the motor is effectively reduced.

With transistors Q4 and Q5 operating in the linear portion of their operating characteristics, variations in the power supply 35 have substantially no effect on the current flowing in resistors 32 and 33 and in the D.C. motor load 34. Consequently, power supply 35 need not be regulated. Moreover, power supply 35 need not be filtered. Power supply 35 may be simply derived from a full wave rectification of a three-phase A.C. supply.

As the motor speed increases to the desired speed, the error voltage decreases toward the steady state error voltage as illustrated in FIG. 3(b). However, the preamplifier output voltage remains constant until the error voltage decreases enough to operate the preamplifier in a linear manner. When this happens, the preamplifier output voltage decreases toward the steady state voltage level 95 (FIG. 3(c)). At this time the current in the output circuit resistors 32 and 33 begins to decrease from the predetermined value. Transistor Q6 becomes reverse biased at this time. Transistors Q4 and Q5 settle into a lower conductivity state so that a smaller steady state current flows in resistors 32 and 33. Another feature of the current limiting feedback network is that it enables transistors Q4 and Q5 to more rapidly settle into their steady state conductivities because the transistors do not saturate.

When the command source 2 issues a command to turn the motor off during forward rotation, the current limiting feedback network in amplifier section 10' operates in substantially the same manner as above described for the current limiting feedback network in amplifier section 10. As explained previously, the turnoff command may occur at time $t_3$ as illustarted in FIG. 3. The error voltage waveform changes abruptly to a positive voltage level 97 to overdrive the motor 1 in the reverse direction. The preamplifier waveform also changes abruptly to apply a positive voltage level 98 to the input 11 of the drive amplifier. Transistor Q1 cuts off and transistor Q1' becomes forward biased so that amplifier section 10 turns off while amplifier section 10' turns on. The voltage levels 97 and 98 are generally large enough to saturate the transistors Q1', Q2', Q3', Q4' and Q5'. The current limiting feedback network which includes transistors Q6' and Q7' operates to prevent saturation of transistors Q4' and Q5' by providing a degenerative feedback when the average current flow in resistors 32' and 33' exceeds a predetermined value. Consequently, power supply 35' may be an unregulated, unfiltered full wave rectified supply.

Although the operatiton of the current limiting feedback networks has been explained with the aid of the illustrated waveforms, these waveforms are intended only to be typical. For example, the command source 2 may issue a command to reverse the rotation of the motor or to turn the motor off during either a positive or a negative overdrive period. In such case, the current limiting feedback networks operate as described above whenever the current flow in the output circuits of the amplifier sections exceeds the predetermined value.

It is a common occurrence in the control system illustrated in FIGS. 1 and 2 that the command source 2 may issue a command for rotation in one of the two directions, and then during the overdrive period issue a command to reverse the direction of the motor or to turn the motor off. When this happens, amplifier section 10 tries to turn off while amplifier section 10' is turning on. The turn on time of amplifier section 10' is rapid. However, the turn off time of amplifier section 10 is relatively slow. This is because the charge on capacitor 26 must be removed before transistors Q3, Q4 and Q5 return to their respective quiescent states. Consequently, the output stage transistors Q4, Q5, Q4' and Q5' may be in their fully on conditions at the same time. Since these transistors are at or near saturation during the overdrive period, the voltage drops across their respective collectors and emitters are quite small. The values of resistors 32, 33, 32' and 33' are also quite small (usually on the order of one-half ohm). Thus, a substantial short circuit exists between circuit points 25 and 25' across power supplies 35 and 35'.

The present invention provides an interlock network to prevent this short circuit condititon. The interlock network includes transistors Q8 and Q8' having their emitters coupled to circuit points 40 and 40', respectively. The bases of transistors Q8 and Q8' are connected by way of resistors 45 and 45', respectively, to circuit point 31. The base of transistor Q8 is connected by way of resistor 46 and bias supply 47 to the ground reference 19. The base of transistor Q8' is connected by way of resistor 46' and bias supply 47' to the ground reference 19. Preferably, resistors 46 and 46' are of the same value and bias supplies 47 and 47' are of the same value.

The collector of transistor Q8 is connected by way of diode 48' and resistor 49' to the base of transistor Q9'. The collector of transistor Q8' is connected by way of diode 48 and resistor 49 to the base of transistor Q9. The base of transistor Q9 is further connected by way of resistor 50 and bias supply 51 to the ground reference 19. The base of transistor Q9' is further connected by way of resistor 50' and bias supply 51' to ground reference 19. Preferably, resistors 50 and 50' have the same value and bias supplies 51 and 51' have the same value.

The emitter-to-collector path of transistor Q9 is connected in shunt across first stage input 13 and the emitter of transistor Q1, which is the common electrode of the first stage 14. The emitter-to-collector path of transistor Q9' is likewise connected in shunt across the input 13' and the emitter of transistor Q1', which is the common electrode of the first stage 14'.

In operation, when the average current flow in resistors 32 and 33 become large enough to overcome the reverse bias placed on transistor Q8 by bias supply 47 and resistor 46, the transistor conducts. As transistor Q8 conducts, its collector voltage decreases. This decreasing collector voltage is coupled by diode 48' and resistor 49' to the base of transistor Q9'. Transistor Q9' becomes forward biased into conduction to maintain a shunt between the base and emitter of transistor Q1'. Consequently, whenever the D.C. motor is rotating in the forward direction, the interlock network operates to maintain a shunt across the input and common electrodes of the input stage 14' of amplifying section 10'. Similarly, when the motor rotates in the reverse direction, the interlock network operates to maintain a shunt across the input and common electrodes of input stage 14 of amplifying sections 10.

When the command source 2 issues a command to change direction of motor rotation during an overdrive period or to turn the motor off, it is apparent that the interlock network prevents the turning on amplifier section from turning on until the current in the output circuit of the turning off section is relatively small. Thus, the likelihood of occurrence of short circuits in the output circuits of the amplifier due to command signals is eliminated.

Although each amplifier section has been illustrated as having two of the output stage transistors Q4 and Q5 connected in parallel, it is apparent that more transistors could be so connected if more current is needed to accelerate the motor. On the other hand, where less current is needed for motor acceleration, it is apparent that only one transistor may develop the required current. Moreover, the illustration of non-inverting type amplifier sections is intended as illustrative. It is apparent that the amplifier sections might be inverting types if the conductivities of the transistors in the current limiting feedback networks and the interlock network are appropriately matched to the output transistors for operation as hereinabove described.

Although the invention has been illustrated with transistors of particular conductivity types, it is apparent that each transistor can be of the opposite conductivity type so long as the diodes and bias supplies are assigned appropriate polarities. It should also be apparent that the bias supplies 21, 21', 28, 28', 47, 47', 51 and 51' which are illustrated with the conventional battery symbol, may be filtered full wave rectified D.C. supplies of a conventional type.

It is also apparent to those skilled in the art that the current limiting feedback technique is also applicable to drive amplifiers for unidirectional D.C. motors. For this case, the drive amplifier could be one only of the illustrated amplifier sections.

What is claimed is:

1. The combination comprising:
    input means for generating a waveform having positive and negative portions,
    a common input terminal and a load impedance, said common input terminal being coupled to said input means,
    first and second amplifier sections, each said section having an input circuit, an output stage, and a common electrode; said input circuit having an input electrode and said output stage including at least one transistor having first and second electrodes defining a conduction path and a control electrode,
    first and second impedance means for respectively coupling the conduction paths of the transistors in the output stages of said first and second amplifier sections, in first and second series circuit with said load impedance,
    means for coupling the input electrodes of the input circuits of said first and second amplifier sections to said common input terminal,
    said first amplifier section responding to said positive portions of said input waveform to provide current flow in said first series circuit and said second amplifier section responding to said negative portions of said input waveform to provide current flow in said second series circuit,
    first interlock means responsive to current flow through said second impedance means for shunting the input and common electrodes of said first amplifier section, and
    second interlock means responsive to current flow through said first impedance means for shunting the input and common electrodes of said second amplifier section.

2. The invention as claimed in claim 1 wherein said first interlock means includes a first transistor having an emitter and collector, the emitter and collector of said first transistor being connected across said input and common electrodes of said first amplifier section, and wherein said second interlock means includes a second transistor having an emitter and collector, the emitter and collector of said second transistor being connected across said input and common electrodes of said second amplifier section.

3. The combination as claimed in claim 1, further comprising first and second feedback means responsive to a predetermined current flow through said first and second impedance means, respectively, for providing first and second degenerative feedback signals in said first and second amplifier sections, respectively.

4. The combination comprising:
    input means for generating a waveform having positive and negative portions,
    a common input terminal and a load impedance, said common input terminal being coupled to said input means,
    first and second amplifier sections, each said section having an input and an output circuit,
    first and second means for respectively coupling said output circuits of said first and second amplifier sections to said load impedance,
    means for coupling said input circuits of said first and second amplifier sections to said common input terminal,
    said first amplifier section responding to said positive portions of said input waveform to provide current flow in said first means and said second amplifier section responding to said negative portions of said input waveform to provide current flow in said second means,
    means responsive to the current flow from said first and second amplifier sections, and
    means for coupling said current responsive means to said first and second amplifier sections for inhibiting operation of said first amplifier section when current flows in said second means and for inhibiting operation of said second amplifier section when current flows in said first means.

5. The combination comprising:
    a load;
    two amplifier sections coupled to said load, one amplifier section for delivering a current in one direction and the other amplifier section for delivering current in the opposite direction to the load; and
    means responsive to current flow of greater than a given value through either amplifier section for rendering inactive the other amplifier section.

6. The combination as claimed in claim 5, wherein said load is a bidirectional direct current motor.

7. The combination comprising:
    a load;
    first and second amplifier sections coupled to said load, one amplifier section for delivering current of one polarity and the other amplifier section for delivering a current of opposite polarity to said load, each said section having an input circuit to which a signal may be applied for causing its amplifier section to conduct current and an output circuit for conveying the amplifier current to said load; and
    means responsive to current flow through either amplifier section for shunting the input circuit to the other amplifier section and thereby preventing current flow through the other amplifier section.

8. The combination set forth in claim 7, wherein said load comprises a reversible motor.

9. The combination comprising:
    a load impedance;
    first and second amplifier sections, each said section having an input circuit to which a signal may be applied for causing its amplifier section to conduct current, and an output circuit;
    means respectively coupling the output circuits of said first and second sections to said load impedance, said first section conveying a first current and said second section conveying a second current to said load impedance;
    current responsive means for sensing said first and second currents; and interlocking means coupling said current responsive means to said first and second amplifier sections for inhibiting operation of said first amplifier section when said second current is flowing and for inhibiting operation of said second amplifier section when said first current is flowing.

10. The combination as claimed in claim 9, wherein said interlocking means includes first and second transistors, each transistor having first and second electrodes defining a conduction path, and a control electrode, and wherein the conduction path of the first transistor is connected in shunt across the input circuit of said first amplifier section and the conduction path of the second transistor is connected in shunt across the input circuit of said second amplifier section.

11. The combination as claimed in claim 10, wherein the output circuit of each of said first and second amplifier sections comprises an impedance and at least one transistor having first and second electrodes defining a conduction path and a control electrode, said impedance being connected in series with said conduction path; and wherein said current responsive means comprises third and fourth transistors, each transistor having first and second electrodes defining a conduction path and a control electrode; said third transistor having its control electrode and one of its first and second electrodes coupled across said impedance of said first amplifier section and the other of its first and second electrodes coupled to the control electrode of said second transistor; said fourth transistor having its control electrode and one of its first and second electrodes coupled across the impedance of said second amplifier section and the other of its first and second electrodes coupled to the control electrode of said first transistor.

12. The combination as claimed in claim 9, further including first and second feedback means responsive to said first and second currents for respectively providing first and second degenerative feedback signals to said first and second amplifier sections.

References Cited

UNITED STATES PATENTS 3,264,570  8/1966  Temple _____ 330—15

NATHAN KAUFMAN, Primary Examiner

U.S. Cl. X.R.

330—15